United States Patent [19]

Robinson

[11] 3,759,104
[45] Sept. 18, 1973

[54] CAPACITANCE THERMOMETER
[76] Inventor: Max C. Robinson, 1270 Quenneville No. 116, Montreal, Quebec, Canada
[22] Filed: Mar. 9, 1972
[21] Appl. No.: 233,372

Related U.S. Application Data
[63] Continuation of Ser. No. 44,431, June 8, 1970.

[52] U.S. Cl. .............................. 73/362 R, 317/247
[51] Int. Cl. ............................................. G01k 7/34
[58] Field of Search .................. 73/362 R, 362 CP; 317/247, 244, 258, 261; 323/75 M, 75 H

[56] References Cited
UNITED STATES PATENTS
3,419,769   12/1968   Elnekave ........................... 317/244
3,544,330   12/1970   Hoffman ............................ 317/258
3,243,792   3/1966    Hamilton ........................ 73/362 CP
3,405,066   10/1968   McGhee ............................. 317/258
3,239,731   3/1966    Matovich ........................... 317/258
3,177,415   4/1965    Kater ................................. 317/261

FOREIGN PATENTS OR APPLICATIONS
613,116     11/1948   Great Britain .................. 73/362 CP
1,043,733   9/1966    Great Britain .................. 323/75 M Primary Examiner—Richard C. Queisser
Assistant Examiner—Denis E. Corr
Attorney—Alan Swabey

[57] ABSTRACT

A thermometer having a sensor formed by a three-terminal capacitor with a suitable temperature-sensitive dielectric interposed between the sensing electrodes, with the sensor being connected to a suitable measuring means, such as a transformer bridge, capable of measuring the direct capacitance of a three-terminal capacitor.

5 Claims, 7 Drawing Figures

Patented Sept. 18, 1973

INVENTOR
Max C. ROBINSON

Alan Swabey
ATTORNEY

CAPACITANCE THERMOMETER

This is a continuation of application Ser. No. 44,431, filed June 8, 1970.

BACKGROUND OF THE INVENTION

1. Field of Invention

This invention relates to thermometers. More specifically the thermometer of the invention is a three-terminal capacitor whose direct capacitance is measured with a transformer bridge, or some other suitable device.

2. Description of Prior Art

Two-terminal capacitors have been suggested for use as temperature sensors. Examples of such thermometers are shown in U.S. Pat. No. 3,257,607 issued June 21, 1966 to Pintell, U.S. Pat. No. 3,266,316 issued Aug. 16, 1966 to Jones et al., U.S. Pat. No. 3,303,701 issued Feb. 14, 1967 to Kiyokata Matsuura et al., and U.S. Pat. No. 3,338,100 issued Aug. 29, 1967 to Takami.

However, the usefulness of such thermometers is severely limited for the following reasons.

The device used for measuring the impedance (capacitance and dissipation) of a two-terminal capacitance sensor, measures at the same time the stray impedance (capacitance and dissipation) between the leads to the sensor. This stray impedance will, in general, fluctuate since it will depend upon the length and relative proximity of the leads as well as the electrical characteristics of the material in the neighborhood of the leads. Therefore, the impedance measured will not only depend on the temperature of the sensor but will also depend upon mechanical vibrations, change in material environment, and temperature in the neighborhood of the leads. To nullify this effect the capacitance of the sensor must be very much greater than the stray capacitance between the leads, or more generally the impedance of the sensor must be very much less than the impedance between the leads. Also the temperature coefficient of the sensor must be relatively high.

The above requirements severely limit the number of material that may be used as dielectrics. The necessity for a large capacitance will also limit the possibility of miniaturization resulting in a sensor that is relatively bulky. Also a two-terminal capacitor cannot be used in a conducting environment, such as molten metals, since the leads will be short-circuited.

Finally, a two-terminal capacitance thermometer will tend to be affected by stray oscillating electromagnetic fields. While this may be eliminated by shielding the device, the result will be an increase in the stray capacitance between the leads. At this point it should be emphasized that, as is well known by those skilled in the art, shielding by itself does not convert a two-terminal capacitor into a three-terminal capacitor.

Three-terminal capacitors and the circuitry therefor are well known and have been used primarily for determining an absolute capacitance measurement. Attention is directed to the article by A.F. Dunn "Determination of an Absolute Scale of Capacitance" published in the Canadian Journal of Physics, Volume 42, (January 1964) pages 53 to 69 and to an article by M.C. McGregor et al. entitled "New Apparatus at the National Bureau of Standards for Absolute Capacitance Measurement" published in the IRE Transactions on Instrumentation, December 1958. In these applications, care is taken to reduce changes in capacitance of a three-terminal capacitor with temperature to a minimum.

As the term is used by those skilled in the art, a three-terminal capacitor contains a third electrode which surrounds the first two electrodes, all three electrodes being rigidly held in place by insulating supports. At least one, but usually both of the leads to said first two electrodes are shielded, the shielding being connected to the third electrode. The construction is such that the leads to said first two electrodes are completely shielded from each other, and the first two electrodes are completely shielded by the third electrode from any other body. Hence, the capacitance between the first two electrodes, which is called the direct capacitance of the three-terminal capacitor, is a well defined quantity being independent of the length of the leads, the shielding of said leads and also independent of the presence of other bodies. If a three-terminal capacitor is inserted in a conventional 4-armed capacitance bridge, such as a Shering bridge, or in some other conventional capacitance measuring device, such as a resonant circuit, an effective capacitance, due to the stray capacitances as well as the direct capacitance, is measured. In such a bridge, a three-terminal capacitor would be indistinguishable from a shielded two-terminal capacitor. It is possible to modify conventional capacitance bridges, by adding the so-called Wagner ground, so that they will measure the direct capacitance of three-terminal capacitors. However, the preferred means for measuring the direct capacitance of three-terminal capacitors ia a 4-armed bridge with tightly coupled inductive arms, commonly referred to as a transformer bridge.

SUMMARY OF INVENTION

The direct capacitance (or simply capacitance) of a three-terminal capacitor can be readily measured using well known techniques with a precision of better than 1ppm and a sensitivity of less than 0.1ppm. Changes in capacitance of less than 1af ($10^{-6}$pf) can be detected. Consequently, a three-terminal capacitor whose capacitance for example is only 1 pf and whose temperature coefficient is only 100ppm can be measured with sufficient precision to enable accurate and sensitive temperature sensing.

Furthermore, the precision and sensitivity of measurement of the capacitance of the sensor will not be affected to an appreciable extent by stray capacitances to the shield of up to about 1,000 pf. Measurement can also be made in the presence of much larger stray capacitances with only a slight loss in precision and sensitivity. These features of high precision and sensitivity in the presence of large stray capacitances distinguish the three-terminal thermometer of this invention from known two-terminal capacitance thermometers.

More generally, the impedance of the sensor of this invention can be several orders of magnitude greater than the stray impedances to the shield, with little or no loss of sensitivity and precision. On the other hand, for other temperature sensors currently in use such as resistors, thermocouples, etc., the impedance of the sensor must be several orders of magnitude less than the stray impedance between the leads or to the shield, if any.

A three-terminal capacitance thermometer has a number of very important advantages. Some of these are:

1. A very large number of different materials have a dielectric constant whose temperature coefficient is sufficiently large to permit their use in the sensor. Out of this extensive class of dielectrics, materials can be chosen which have additional desirable features, such as the ability to withstand corrosive atmospheres for example.

2. Since the capacitance can be very small, the physical size of the capacitor can also be made very small.

3. Sensors made of suitably chosen materials may be used to detect temperatures from less than 0.1 K to above 2,000°C. This range may be covered easily with three sensors having different dielectrics.

4. The dissipation can readily be made negligible. This is of particular importance in cryogenic thermometry.

5. Different dielectrics can be chosen such that the sensor is essentially unaffected by a magnetic field. This represents a solution to a major problem in cryogenic thermometry.

6. By a proper choice of dielectrics and metals for the electrodes, a sensor can be built which performs effectively in a corrosive environment.

7. Dielectric can be chosen such that the temperature dependence is approximately linear over a range of several hundred degrees. Alternatively, the dielectric can be such that the thermometer can be extremely sensitive (to $10^{-6}$°C or better) over a limited range of a few degrees.

8. Since a three-terminal capacitor is in practice shielded by its third electrode, the sensor of this invention will not be affected by alternating electromagnetic fields.

9. All the three-terminal capacitance sensors can be connected to the same transformer bridge.

It is believed that no other type of thermometer has all the above advantages.

BRIEF DESCRIPTION OF DRAWINGS

Further features, objects and advantages will be evident from the following detailed description taken in conjunction with the accompanying drawings in which:

Referring to FIG. 1(a), the invention basically includes a three-terminal capacitance sensor at 1 connected to a transformer bridge 5 via shielded electrical leads 2 and 3. The third electrode of the capacitor encloses and shields the two sensing electrodes and is connected to the shield 4 of the leads and of the transformer bridge.

FIG. 1(b) shows the main elements of a typical transformer bridge and includes an AC signal generator 6, a closely wound transformer 7, a sensitive detector 8, and a bank of three-terminal capacitors of known value of which one is shown, 9. The sensor is indicated by 1. Voltage taps are usually placed along the secondary of the transformer. The capacitor 9 is shown connected to one of them. Details of a preferred form of capacitor are shown in FIG. 4 and the device will be described in more detail hereinbelow. Not shown are other details of the transformer bridge, well known to those skilled in the art, such as additional voltage dividers, resistors, phase adjusting circuits, etc.

The capacitance and dissipation of the sensor are determined by balancing the bridge or by partially balancing the bridge and reading the off-balance voltage on the meter 8 or on the digital display of the detector. The bridge may be balanced manually or may be self-balancing.

Once the sensor has been calibrated, the temperature is usually measured by determining the capacitance of the sensor. In certain cases, especially at high temperatures, the temperature may also be measured by determining the dissipation of the sensor.

It is preferable, for a number of reasons, to make the sensors as small as possible. These include 1. Adaptability to mass production techniques.
2. Low cost.
3. Small mass, hence rapid response.

The sensors may be made from bulk materials, from a combination of bulk materials with thick or thin films, or from thick or thin films only. The production techniques are the standard techniques used in the manufacture of microelectronic components such as sputtering, high vacuum evaporation, silk-screen printing, and chemical plating.

Figure 1A:
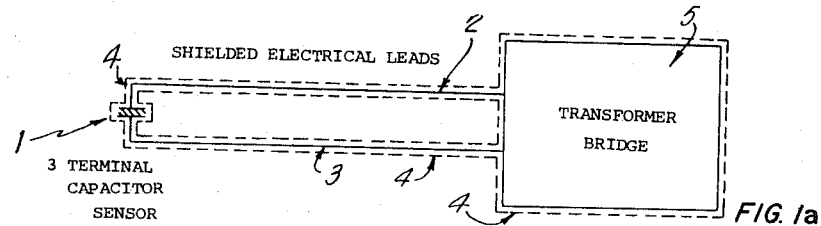
FIG. 1(a) shows a general schematic layout of the thermometer of the present invention.
Figure 1B:
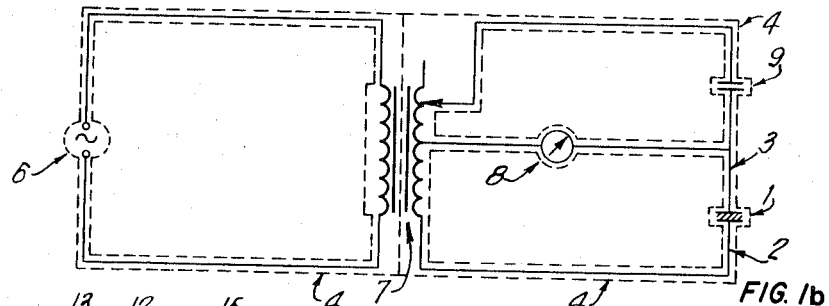
FIG. 1(b) is a circuit diagram showing the most essential features of the thermometer of the present invention and a particular version of the measuring means — namely, a transformer bridge.
Figure 2A:
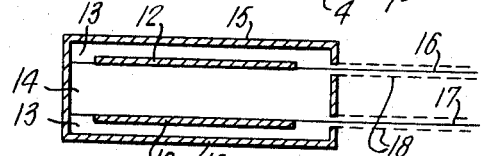
FIG. 2(a) is a schematic diagragm of a section through a sensing capacitor constructed in accordance with the present invention.
Figure 2B:
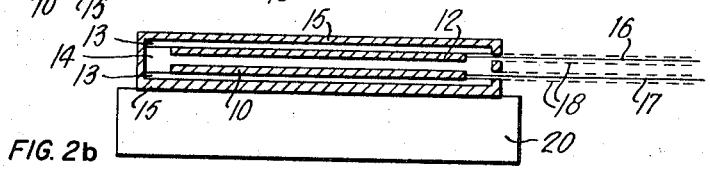
FIG. 2(b) is a view similar to FIG. 2(a) showing a thin or thick film planar configuration of the capacitor deposited upon a substrate.
Figure 2C:
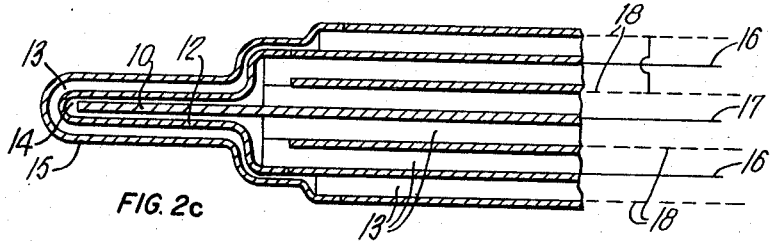
FIG. 2(c) is a view similar to FIG. 2(a) showing a thin or thick film coaxial configuration of the capacitor deposited upon the axial electrode.

Some possible configurations, including planar and coaxial geometries are shown in FIG. 2(a), 2(b) and 2(c). The two sensing electrodes 10 and 12 are separated by an appropriate dielectric 14. The variation with temperature of the dielectric constant of this material 14, and to a lesser extent its thermal expansion, determine the variation with temperature of the sensor capacitance. The third electrode 15 surrounds and shields the electrodes 10 and 12. The electrode 15 is connected to the shield 18 of the leads 16 and 17. The electrode 15 is insulated from the electrodes 10 and 12 by an appropriate dielectric 13, which may or may not be the same material as 14.

Normally the sensor will be very much smaller than shown in the diagram. The relative thickness and lengths of the electrodes may also vary considerably from those shown in the diagrams.

In FIG. 2(a) the sensing electrodes 10 and 12, the insulating dielectric 13 and the third electrode 15 have all been deposited on the dielectric 14 which is a thin slab.

In FIG. 2(b) the entire sensor has been deposited upon a substrate 20. The sensor in this case consists of thin or thick films or a combination of thin and thick films.

In FIGS. 2(c) the capacitor is coaxially deposited upon one of the sensing electrodes 10. The remaining electrodes and dielectrics are either thin or thick films.

The correct choice of the configuration and the materials used as dielectrics, electrodes and leads depend on a number of factors such as temperature range to be covered, accuracy desired, environment to which the sensor is to be exposed, and the space available for installing the sensor.

If the sensor is designed for high temperatures the electrodes and leads are made of refractory metals such as tungsten, chromium, molybdenum, tantalum, niobium, etc. Most metals, but particularly copper and gold, are suitable for the cryogenic sensor. Electrical leads for use at a very low temperature should have high thermal resistance to minimize heat conduction into the low temperature environment; this can be accomplished with high resistance alloys such as Nichrome, Manganin, etc., or with superconducting materials such as a lead-tin alloy (solder) or with a combination of the two.

Pure dielectrics can be used in the temperature range from about 1 K to about 300 K (room temperature). For maximum sensitivity at low temperatures a dielectric with a low Debye temperature such as RbI is preferable.

For higher sensitivity at low temperatures and for use below 1 K, a suitable, well behaved dielectric such as an alkali halide containing a very small concentration of dipolar impurities (typically $10^{16}$ to $10^{19}$ dipoles/cm$^3$) is preferable. At a sufficiently low temperature the capacitance of a capacitor containing such a doped dielectric obeys the relation $$C = C' + C''/T$$

wherein $C'$ and $C''$ are positive constants and T is the absolute temperature. Such a capacitor makes an ideal thermometer at very low temperatures, as its sensitivity increases with decreasing temperature. The low temperature limit of this equation is determined by the so-called zero-field splitting. The magnitude of this splitting can be shown to vary inversely as some power $n$ ($n$ 41) of the dipolar impurity's moment of inertia. Examples of such impurities are OCS, alcohols, CCl$_3$Br, etc. Host lattices capable of accommodating such large dipolar impurities are clathrates and zerolites, which have large voids in their structure.

The present known low temperature limit for the above equation is about 0.1 K for small concentrations (3 × $10^{18}$ dipoles/cm$^3$) of CN in RbCl. The limit is about 0.3 K for OH in KCl and probably about the same for OH in NaCl.

Figure 3:
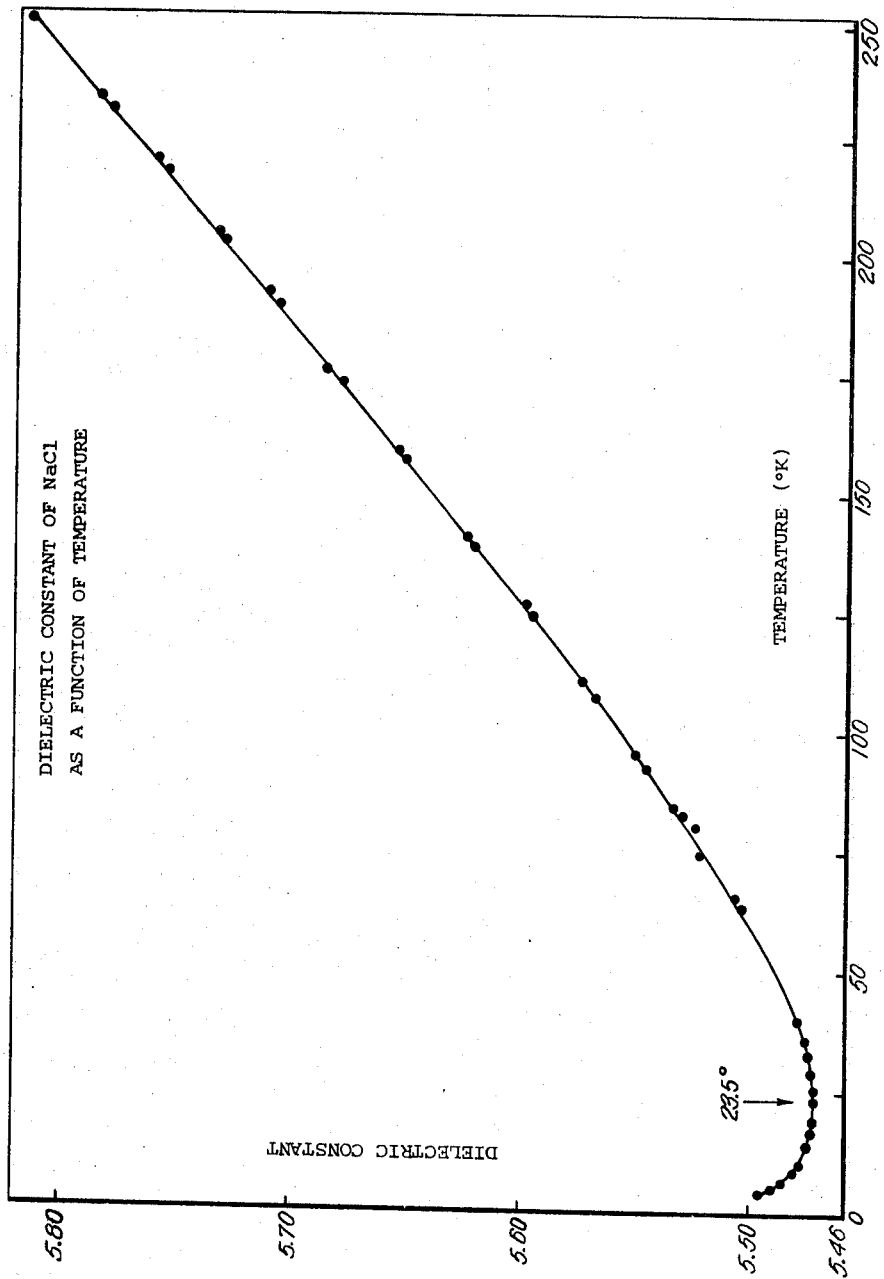
FIG. 3 shows a typical dielectric constant vs temperature graph for one specific material illustrating how the capacitance varies with temperature of the material (NaCl)

A typical dielectric constant versus temperature curve for NaCl containing about $10^{17}$ dipolar impurities per cm$^3$ is shown in FIG. 3. The capacitance versus temperature curve of a three-terminal capacitor containing such a dielectric between the sensing electrodes differs very slightly from that shown in the diagram. This small effect, due to thermal expansion, makes the curve slightly more linear at higher temperatures.

As shown, the dielectric constant versus temperature curve obeys the relation $$C = C' + C''/T$$

below about 10 K to some lower unknown limit probably about 0.1 K. From about 75 K and up the curve is approximately linear. However, in the region around the minimum at 23.5 K the sensor tends to lose its sensitivity.

The insensitive region noted above varies from one dielectric to another and also with the dipolar impurity concentration. For example, the insensitivie region may be shifted to higher temperatures for increasing the dipolar impurity concentration. It is believed that the low temperature minimum in the curve can be avoided altogether by using suitable doped dielectrics which when pure have a negative temperature derivative up to room temperature and above. In such a dielectric the effect of the dipolar impurities normally is to increase the magntidue of the slope at low temperatures without any change in sign of the temperature derivative.

The following are examples of materials that may be used as dielectrics for low temperature sensing: NaCl, KCl, KBr, TlCl, TlBr, AgCl, RbI and AgBr.

It is also belived, based on theoretical and experimental considerations, tha other material selected from the following groups should prove satisfactory:
1. The alkali halides.
2. The silver or thallous halides.
3. Alkaline earth chalcogenides.
4. Zeolites.
5. Clathrates.
6. The noble gas elements.

Some of the above materials may be doped with one or more dipolar impurities such as OH, CN, CO, NO, HD, NO$_2$, OCS, alcohols, CCl$_3$Br, etc.

To this list of possible dipolar impurities should be added monopolar impurities such as Li+ or Ag+ which when present as impurities in some crystals, eg. Li+ in KCl, appear to have a dipole moment. The reason for this phenomenon is believed to be due to the relatively small size of the Li+ ion compared to K+.

For high sensitivity measurements in a narrow temperature range, at both low and intermediate temperatures ferroelectric and antiferroelectric materials such as KH$_2$PO$_4$, BaTiO$_3$, and isomorphous materials like KTaO$_3$, KNbO$_3$ are preferred. Sharp changes in the dielectric constant at the so-called transition temperatures such as are encountered in ferroelectric and antiferroelectric materials can be used as temperature calibration points.

Some of the properties which render a dielectric material suitable for use in a capacitor-sensor for use at high temperature at the following:
1. High melting point.
2. High electrical resistivity.
3. High purity.
4. Crystalline structure, preferable in the form of a single crystal.

These properties are satisfied by many oxides, nitrides and other compounds; Beryllia (BeO), sapphire (Al$_2$O$_3$), quartz (SiO$_2$), magnesia (MgO), and boron nitride (BN) have very satisfactory combinations of properties.

It has been mentioned hereinabove that precision in capacitance measurement of better than 1 part per million could be obtained by employing suitable measuring means such as transformer bridges. To obtain this result requires that the value of the standard or known capacitors used in the bridge have a substantially constant capacitance regardless of temperature changes. (Attention is directed to the said articles of A.F. Dunn and M.C. McGregor referred to hereinabove). The capacitors heretofore proposed for this use are relatively complex and expensive to build. The following innovation will simplify the design and provide a form of capacitor with a capacitance substantially independent of temperature.

Figure 4:
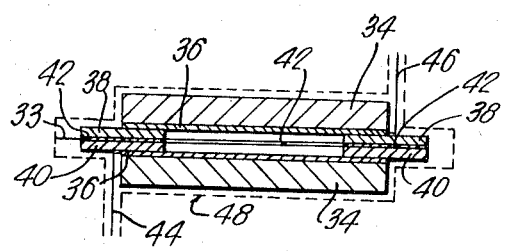
FIG. 4 shows a cross section through a three-terminal calibration capacitor constructed in accordance with the present invention.

As shown in FIG. 4, capacitors formed by a pair of electrodes 34 which preferably are plated slabs, plated as indicated at 36 with gold or similar chemically inert conducting material and separated by a pair of stacked rings 38 and 40 of material such as quartz which has a very low thermal expansion coefficient. A thin conducting film 42 is deposited onto one of the flat surfaces of one or both of the rings 38 and 40 and two flat surfaces of the rings are then pressed together with the film or films therebetween, and the films are connected to the shield (not illustrated in FIG. 4) by an electrical lead 33. The other two electrodes are formed by the plates 34 and are provided with the conventional leads 44 and 46 which, when the capacitor is used in the present invention, will preferably be shielded.

The distance between the two electrodes 34 is equal to the combined thickness of the two rings 38 and 40 and the effective area is fixed by the inner area of the rings. Thus, the electrical dimensions of the capacitor are entirely determined by the rings. However, the capacitance is independent of the dielectric constant of the rings as the lines of force between the two plates 34 do not pass through these rings.

Neglecting end effects, the capacitance of a parallel plate capacitor is given by $$C = 8.85 \; A/d.$$

wherein $d$ is the distance between the plates in meters, $A$ is the area in $m^2$, and $C$ in picofarads. Thus, if $d = 1$ mm, and the diameter is 12 mm, $C = 1$ pf. By varying the dimensions of the quartz rings and by stacking the individual units, one can build capacitors with values ranging from $10^{-5}$ pf or less, to $10^3$ pf or more. The interiors of the capacitors may be either evacuated or filled with an inert gas, after which they are placed inside a sealed metallic enclosure. The space between capacitor and enclosure wall is filled with a foam material which acts as protection and thermal insulation.

Having broadly described the present invention, modifications will be evident to those skilled in the art without departing from the spirit of the invention as defined in the appended claims.

I claim

1. A thermometer comprising a sensor having a three-terminal capacitor, said capacitor including a first and a second sensing dielectric having respective leads, a temperature sensitive dielectric interposed between said first and second electrodes, a third shielding electrode having a lead, said third electrode surrounding said first and second electrodes and insulated therefrom for fixing the direct capacitance between said first and second electrodes so that said direct capacitance is a well defined function of temperature, said lead of said third electrode shielding at least one of said other leads, a transformer bridge having closely coupled tapped windings, an oscillator connected to at least one tap on one of said windings; a bank of at least one reference three terminal capacitor having one of the first and second electrodes thereof connected to a tap on one of said windings, detecting means connected to at least one tap on one of said windings for comparing the direct capacitances of said sensor and said bank of reference capacitors, one of said leads of said first and second electrodes of said three terminal capacitance sensor being connected to a tap on said one of said windings, the other of said leads of said first and second electrodes of the three terminal capacitance sensor being connected to the other of said first and second electrodes of said bank and said detecting means. said third electrodes of both said sensor and said bank of reference capacitors being connected together and to the shielding, said transformer bridge measuring said direct capacitance between said first and second electrodes and changes therein without being substantially affected by any stray capacitances.

2. A thermometer as defined in claim 1 wherein said three-terminal capacitor has a doped dielectric, said doped dielectric having a sensitivity that increases with decreasing temperature within a well defined temperature range.

3. A thermometer as defined in claim 1 wherein said temperature sensitive dielectric is a ferroelectric or antiferroelectric material whose transition temperature provides a reference temperature.

4. A thermometer as defined in claim 1 wherein said temperature sensitive dielectric is a material selected from the group consisting of BeO, $Al_2O_3$, $SiO_2$, BN, and where said pair of electrodes are made from material selected from the group consisting of tungsten, chromium, molybdenum, tantalum, niobium.

5. A thermometer as defined in claim 1 wherein said reference capacitor has a pair of rings separating said first and second electrodes, a shield connected to said third electrode formed by plating to form a film on at least one of said rings, said third electrode being interposed between said pair of rings whereby the electrical dimensions of said reference capacitor are determined by the dimensions of said rings.

* * * * *